(12) United States Patent
Murai

(10) Patent No.: US 8,032,721 B2
(45) Date of Patent: Oct. 4, 2011

(54) ACCESS CONTROL APPARATUS AND ACCESS CONTROL METHOD

(75) Inventor: Hiroaki Murai, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 401 days.

(21) Appl. No.: 12/260,488

(22) Filed: Oct. 29, 2008

(65) Prior Publication Data

US 2009/0113147 A1   Apr. 30, 2009

(30) Foreign Application Priority Data

Oct. 30, 2007   (JP) ................................ 2007-282089

(51) Int. Cl.
  *G06F 12/00*   (2006.01)
(52) U.S. Cl. ........................................................ 711/154
(58) Field of Classification Search .................. None
  See application file for complete search history.

(56) References Cited

U.S. PATENT DOCUMENTS

| | | | | |
|---|---|---|---|---|
| 5,732,050 A | * | 3/1998 | Horie | 369/47.14 |
| 6,967,917 B1 | * | 11/2005 | Numata et al. | 369/53.17 |
| 7,719,939 B2 | * | 5/2010 | Akahoshi et al. | 369/53.17 |
| 7,724,620 B2 | * | 5/2010 | Fuchiwaki | 369/53.17 |
| 2006/0146431 A1 | * | 7/2006 | Tsujimura et al. | 360/31 |
| 2010/0232276 A1 | * | 9/2010 | Takahashi et al. | 369/53.17 |

FOREIGN PATENT DOCUMENTS

| | | |
|---|---|---|
| JP | 11-327808 | 11/1999 |
| JP | 2003-196924 | 7/2003 |

* cited by examiner

*Primary Examiner* — Hiep Nguyen
(74) *Attorney, Agent, or Firm* — Staas & Halsey LLP

(57) ABSTRACT

An access control apparatus includes a memory and a command executor executing an access process on a command with the command completion time limit. An address of an inaccessible recording area is stored in the memory. Data attempted to be written on the inaccessible recording area is obtained. The data is stored in association with the address in the memory. An automated alternate processor executes the automated alternate process of the inaccessible recording area in a predefined period of time after the process executed by the command executor is completed. A memory updater deletes the address of the inaccessible recording area whose automated alternate process has succeeded and the data attempted to be written in the recording area at the address.

12 Claims, 7 Drawing Sheets

FIG. 1A

| LBA | 10 | 11 | 12 | 13 | 14 | 15 | |

FIG. 1B

ALTERNATE AREA

| | 13 | ... | ... |
| | 0 | 1 | ... |

FIG. 1C

ALTERNATE TABLE

| 13 → 0 |
| ... |
| ... |

ACCESS CONTROL APPARATUS AND ACCESS CONTROL METHOD

CROSS-REFERENCE TO RELATED APPLICATIONS

This application is based upon and claims the benefit of priority of the prior Japanese Patent Application No. 2007-282089, filed on Oct. 30, 2007, the entire contents of which are incorporated by reference herein.

BACKGROUND

The present application discloses an access control apparatus and an access control method for controlling accesses to each recording area on a disk on a command with a time limit requiring completion of the command in a predefined period of time.

Recently, magnetic disk apparatuses (hereinafter referred to as HDDs) are widely used as data storage incorporated in personal computers (hereinafter referred to as PCs) or connected to the PCs. The use of the HDDs has been expanding in application, not only for PCs, but for various equipment such as video recorders and car navigation systems requiring storage of a large amount of data.

Not all sectors in a recording area of the magnetic disk (hereinafter referred to as an HD) mounted in the HDD are writable or readable. There are defective sectors in the recording area to which data can not written or from which data can not read. Therefore, the HDDs require a process which is called an automated alternate process.

FIGS. 1A, 1B, and 1C are explanatory illustration of the automated alternate process.

Each sector included in the recording area of the HD is assigned a logical block addressing (LBA) address for identifying the sector as shown in FIG. 1A. In this application, data are written onto each sector in numerical order as LBA 10, 11 and 12. For example, if writing data onto a sector at LBA address 13 fails and the data are not written when retrying the access a predefined number of times, the data attempted to be written in the sector at LBA address 13 are stored in a sector at LBA address 0 as shown in FIG. 1B. Then, information that the data attempted to be written in the sector at LBA address 13 are stored in the sector at LBA address 0 is recorded in an alternate candidate table shown in FIG. 1C provided in a different area of the HD.

Therefore, the data are read from the sector at LBA address 0 instead of the sector at LBA address 13 when a read command to read the data stored in the sector at LBA address 13 is received.

As described above, the process for storing data on the alternate sector instead of the sector on which the data are initially attempted to be written is called an alternate process. An alternate process that is executed automatically in a specific sequence is called the automated alternate process.

However, the automated alternate process takes a long time when an access to a sector is retried and failed. The automated alternate process takes a long time because a magnetic head is moved to the alternate area to store the data and the information on the alternate sector is recorded in the alternate candidate table.

For example, stream commands such as movies and music require real-time processing. These stream commands are issued with a command completion time limit (CCTL). The command completion time limit requires execution of the commands in a period of time specified by the time limit absolutely. If the accesses to multiple sectors are retried during execution of the stream command, a time-out error will occur and the movie or the music may be intermittent.

Japanese Laid-open Patent Publication No. H11-327808 discloses that the automated alternate process is not executed when the time is running out even though the process is required.

In Japanese Laid-open Patent Publication No. H11-327808, the automated alternate process is not executed. Therefore, data to be stored at the sector are not stored. Thus, the data to be read from the sector does not exist. This leads to deterioration of a data quality such as an image quality of the movie or a sound quality of the music.

Japanese Laid-open Patent Publication No. 2003-196924 discloses that the automated alternate process is not executed immediately after failing to store the data. The data are stored in an interim buffer and the data are read from the buffer and stored on the alternate sector of the HD when processing time is finished.

However, Japanese Laid-open Patent Publication No. 2003-196924 discloses only the write process onto the HD, and mentions no comprehensive process including a read process. Besides, Japanese Laid-open Patent Publication No. 2003-196924 does not point out an issue or offer a solution when a write command is reissued and the sector at the LBA address is accessed again before the data stored in the interim buffer are stored on the HD or a read command is issued and the sector at the LBA address is accessed.

SUMMARY

Accordingly, an object of the present application is to provide an access control apparatus and an access control method for executing an automated alternate process in reading and writing data without causing time-out errors.

According to the application, an access control apparatus that controls an access to a recording area of a recording medium on a command with a command completion time limit requiring completing the command in a predefined period of time includes a writable and readable memory, a command executor executing an access process on the command, storing an address of an inaccessible recording area in the memory when an access error is caused, obtaining data attempted to be written on the inaccessible recording area and storing the data associating to the address of the inaccessible recording area in the memory, an automated alternate processor executing the automated alternate process of the inaccessible recording area in a predefined period of time after the process executed by the command executor is completed, and a memory updater deleting the address of the inaccessible recording area whose automated alternate process has succeeded and the data attempted to be written in the recording area at the address.

The above-described embodiments are intended as examples, and all embodiments of the present application are not limited to including the features described above.

BRIEF DESCRIPTION OF THE DRAWINGS

FIGS. 1A, 1B, and 1C illustrate the automated alternate process;

DETAILED DESCRIPTION OF THE PREFERRED EMBODIMENTS

Figure 2:
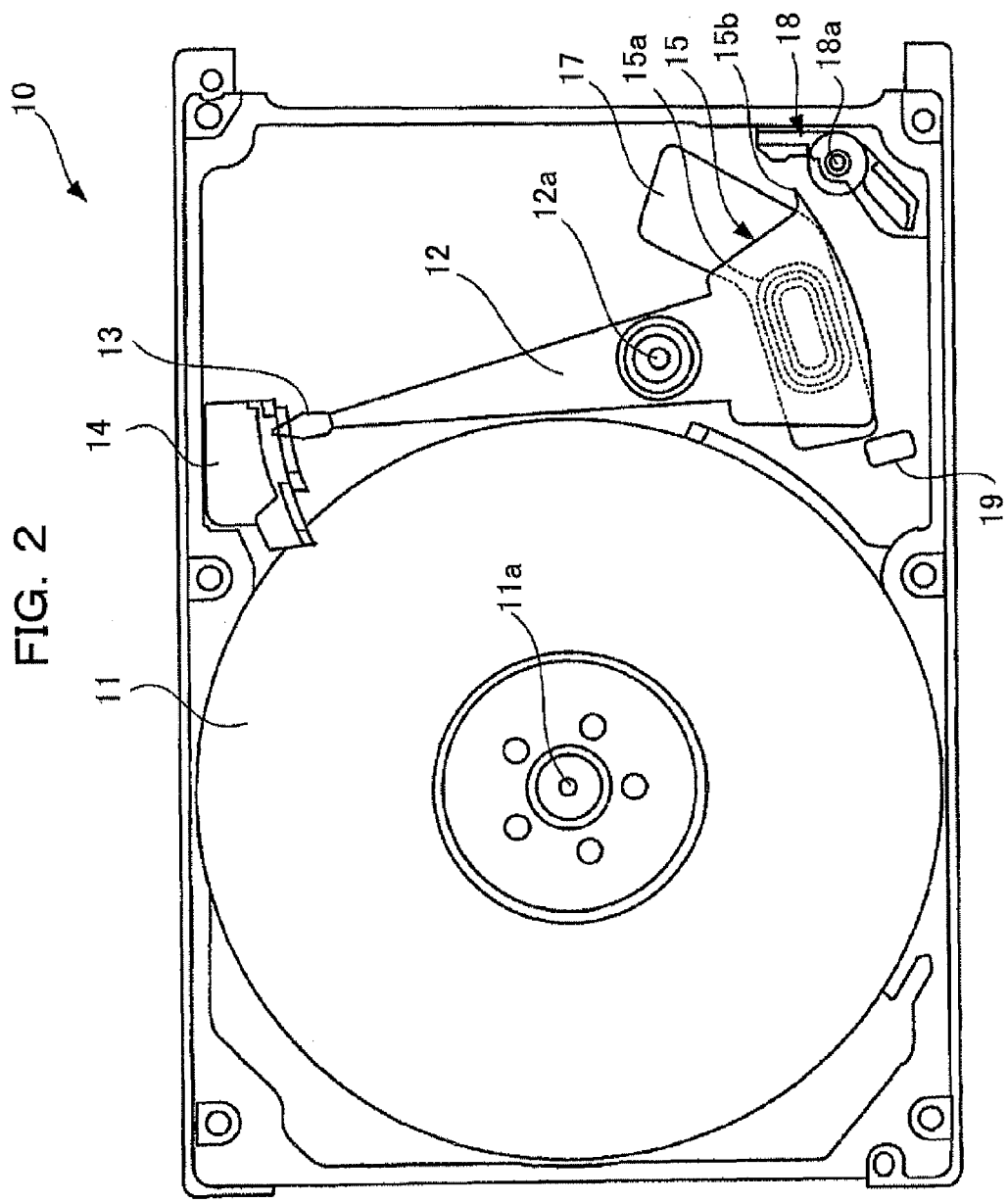
FIG. 2 is a plane view of the magnetic disk apparatus according to an embodiment of the present invention.

Reference may now be made in detail to embodiments of the present application, examples of which are illustrated in the accompanying drawings, wherein like reference numerals refer to like elements throughout.

An embodiment of the present invention will be disclosed below.

FIG. 2 is a plane view of the magnetic disk apparatus according to an embodiment of the present invention.

A magnetic disk apparatus 10 shown in FIG. 2 has magnetic disks 11 rotating about a spindle 11a of the spindle motor (SPM) (not shown in the accompanied drawings). The magnetic disk apparatus 10 has an actuator 12 rotating about a shaft 12a. The magnetic disk apparatus 10 has magnetic heads 13 attached on each tip of the actuator 12 so as to oppose to each magnetic disk and access to recording areas on the magnetic disks 11 as the actuator 12 rotate. The magnetic disk apparatus 10 has a ramp 14 in which the tips of the actuator 12 are caught when the magnetic heads 13 are unloaded from above the magnetic disks 11.

Further, the magnetic disk apparatus 10 has a coil 15a at the posterior end of the actuator 12. Fixing magnets 17 are situated on and under the posterior end of the actuator 12. The fixing magnets 17 and the coil 15a are included in a voice coil motor (VCM). The actuator 12 is rotated by an interaction between a current flowing through the coil 15a and a magnetic force of the fixing magnets 17.

Further, the magnetic disk apparatus 10 has an outer stopper 19. The outer stopper 19 contacts with the posterior end 15 of the actuator 12 rotated when the actuator 12 is unloaded.

Further, the magnetic disk apparatus 10 has an inertia latch 18. The inertia latch engages a protrusion 15b provided on the right side of the posterior end of the actuator 12 by rotating about a spindle 18a when the actuator 12 is subjected to a force in a load direction of the actuator caused by an impact on the magnetic disk apparatus 10. As a result, the actuator 12 does not rotate further in the load direction and the magnetic heads 13 do not collide with the magnetic disks 11.

Figure 3:
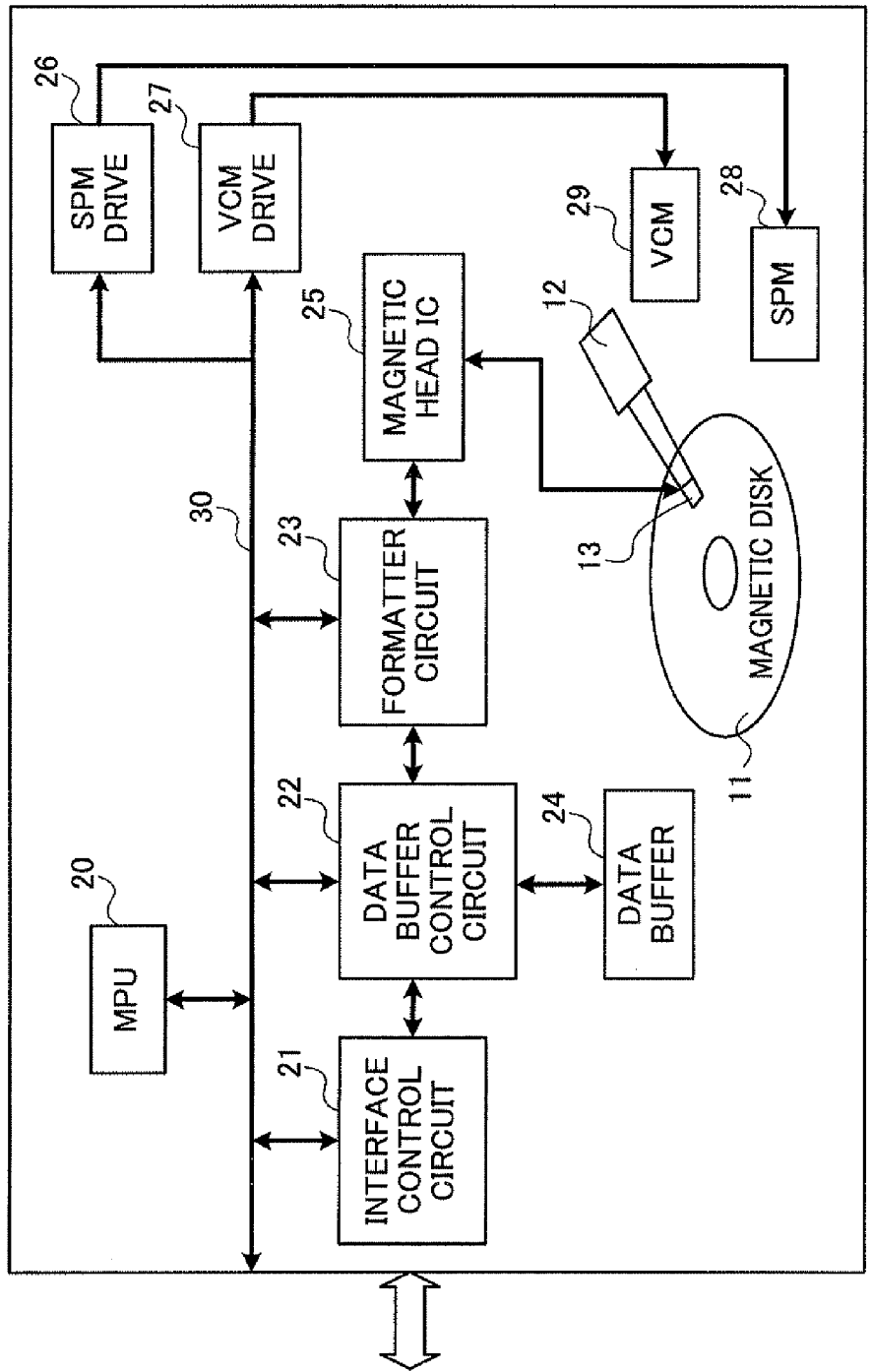
FIG. 3 is a block diagram illustrating a circuit structure of the magnetic disk shown in FIG. 2.

FIG. 3 is a block diagram illustrating the circuit structure of the magnetic disk apparatus shown in FIG. 2.

FIG. 3 shows an MPU 20, an interface control circuit 21, a data buffer control circuit 22, a data formatter circuit 23, a data buffer 24, a head IC 25, an SPM drive 26, a VCM drive 27, an SPM 28, a VCM 29, the magnetic disk 11, the actuator 12 and the magnetic head 13 attached to the tip of the actuator.

The MPU 20, the interface control circuit 21, the data buffer control circuit 22, formatter circuit 23, the SPM drive 26 and the VCM drive 27 are connected through a bus 30.

The MPU 20 executes various programs to control entire magnetic disk apparatus. A control that is specific to this embodiment will be discussed later.

The interface control circuit 21 transmits data or commands between the magnetic disk apparatus and a connected external apparatus, i.e., a CPU incorporated in a PC. The commands received through the interface control circuit 21 are sent to the MPU 20 and the MPU 20 executes processes on the commands.

The data buffer control circuit 22 buffers data sent from the external apparatus through the interface control circuit 21. Thereafter, the data are read out from the data buffer 24 sent to the formatter circuit 23. The data buffer control circuit 22 buffers data sent from the formatter circuit 23 in the data buffer 24. Thereafter, the data are sent to the interface control circuit 21. The interface control circuit 21 transmits the data sent from the data buffer control circuit 22 to the external apparatus. Moreover, the data buffer control circuit 22 stores or read LBA address information on inaccessible sectors and data attempted to be written on the sectors in the data buffer 24.

The formatter circuit 23 formats the data sent from the data buffer control circuit 22 and sends the data to the head IC 25. The formatter circuit 23 sends the data received from the head IC 25 to the data buffer control circuit 22.

The head IC 25 drives the heads 13 to write data onto or read data from the magnetic disks 11.

The SPM drive 26 drives the SPM 28 to rotate the magnetic disks 11 under a control of the MPU 20. The VCM drive 27 drives the VCM 29 to rotate the actuator 12 by supplying the current to the coil 15a (shown in FIG. 2) under the control of the MPU 20. The magnetic heads 13 are positioned on opposite sides of an arbitrary sector on the magnetic disk 11 as the magnetic disk 11 and the actuator rotate.

Figure 4A:
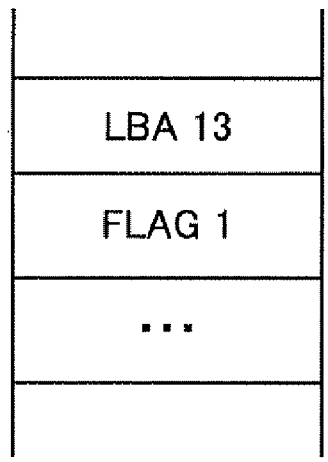
FIGS. 4A and 4B illustrate an alternate candidate table and dedicated work areas provided in a data buffer shown in FIG. 3, respectively.
Figure 4B:
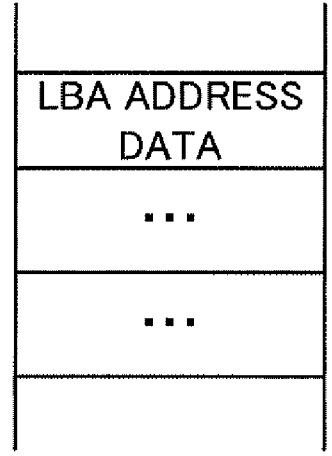

FIG. 4 is the alternate candidate table shown in FIG. 4(A) and the dedicated work areas shown in FIG. 4(B) stored in the data buffer shown in FIG. 3.

The data buffer 24 is used for buffering data transmitted between the interface control circuit 21 and the formatter circuit 23. The alternate candidate table and the dedicated work areas are not stored in a specific area other than a data storage area to avoid overwriting.

The alternate candidate table provides pairs of an LBA address of an inaccessible sector and a flag. Where the flag is "1", data attempted to be written in the sector or having been written in the sector are stored in the dedicated work area. Where the flag is "0", the data attempted to be written in the sector or having been written in the sector are not stored in the dedicated work area.

The alternate candidate table shown in FIG. 4A provides LBA address 13 and flag 1 indicating that a sector at LBA address 13 causes an access error and data attempted to be written on the sector or having been written on the sector are stored in the dedicated work area. The dedicated work area shown in FIG. 4B stores the data attempted to be written in the sector or having been written in the sector.

A condition that the flag becomes "1", i.e., the condition that data are stored in the dedicated work area and a condition that the flag becomes "0", i.e., the condition that data are not stored in the dedicated work area will be disclosed later.

Figure 5:
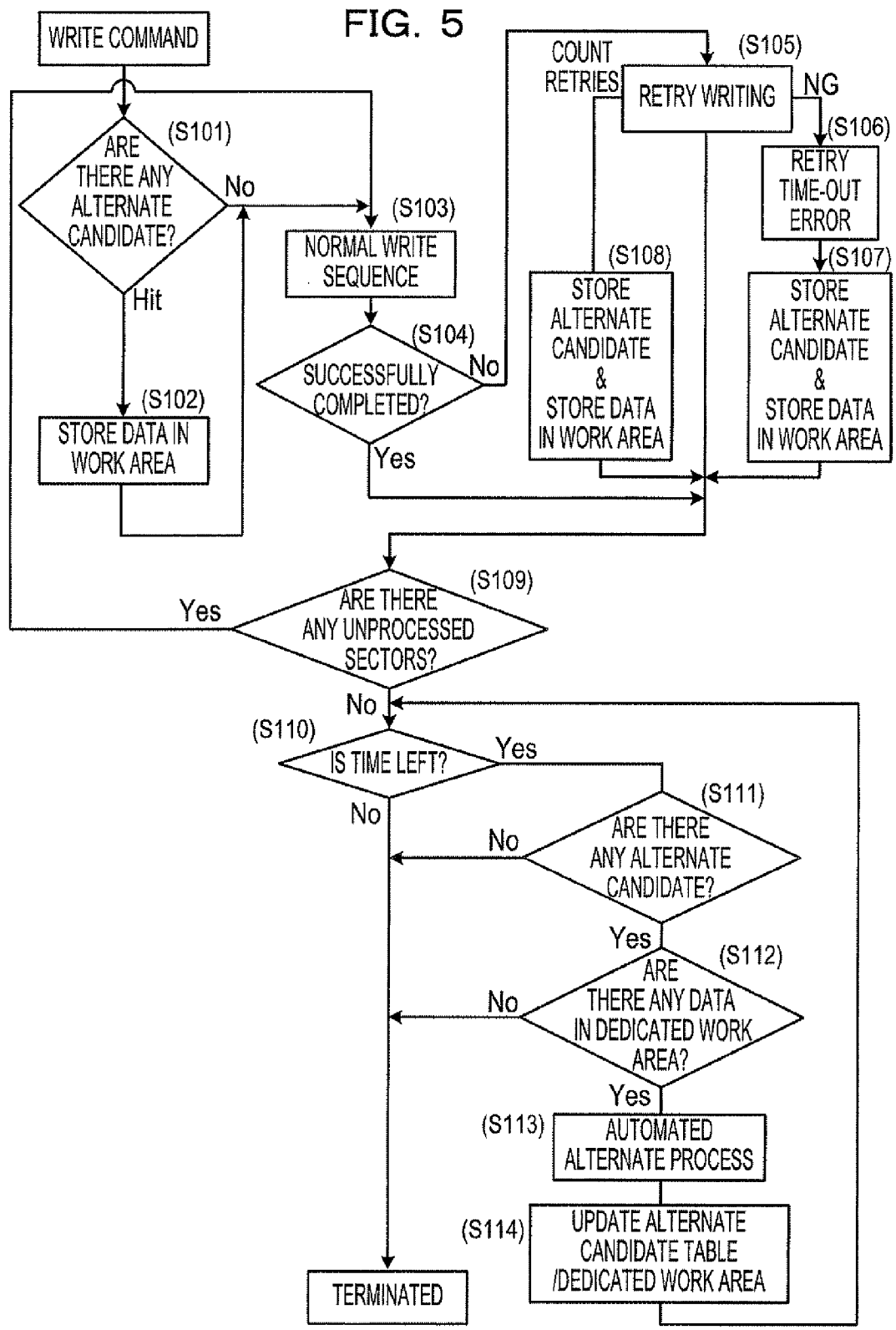
FIG. 5 is a flow chart illustrating a process executed by a MPU on receiving a write stream command.

FIG. 5 is the flow chart illustrating the process executed by the MPU 20 on receiving the write stream command.

The write stream command commands to write data on the magnetic disks 11 and requires completing the writing in a predefined period of time.

On receiving the write stream command, the MPU 20 checks whether LBA addresses of sectors on which data will be written on the write stream command are registered in the alternate candidate table in operation 101. When the LBA addresses of the sectors are registered in the alternate candidate table, flags corresponding to the LBA addresses are rewritten to "1" respectively and data attempted to be written on the sectors are stored in correspondent dedicated work areas in operation S102.

When the LBA addresses of the sectors are not registered in the alternate candidate table in operation S102, or the data are stored in the dedicated work area in operation S102, the process moves on to operation S103. Then a write sequence is executed to one of the sectors other than the sectors at the LBA addresses registered in the alternate candidate table.

Then, whether the writing is completed successfully is judged in operation S104. When the writing is judged as an abnormal end in operation S104, the writing is retried the predefined number of times in operation S105. If the writing is not completed successfully when the writing is retried the predefined number of times, a time-out error is caused in operation S106. An LBA address of the sector that causes the time-out error is registered in the alternate candidate table and a flag corresponding to the LBA address is rewritten to "1" in operation S107. Moreover, data attempted to be written on the sector at the LBA address are stored in the dedicated work area.

When the data are successfully written by retrying the writing more than a threshold number of and less than the predefined number of times in operation S105, the process moves on to operation S108. In this case as well as the case in which the retry time-out is caused, the LBA address of the sector is registered in the alternate candidate table. At the same time, a flag corresponding to the address is rewritten to "1". Moreover, the data attempted to be written on the sector at the LBA address are stored in a dedicated work area. Although the data are successfully written, the sector will not be used thereafter because the data were written on the sector successfully by retrying the writing more than the threshold.

When the data are successfully written on the sector by retrying the writing less than the threshold in operation S105, the address of the sector and the data to be written on the sector are not stored in the alternate candidate table and the dedicated work area respectively. The sector is used thereafter.

Whether there are sectors on which the data are not written yet is judged excluding the sectors whose addresses are registered on the alternate candidate table and the sectors on which the data have been written yet in operation S109. When the sectors on which the data have not been written remain, the process goes back to operation S103 and the same sequence is repeated to one of the remaining sectors.

No sector remains in operation S109, and the automated alternate process is executed. First, a remaining time is derived by subtracting a time spent on the processes described above from the predefined time for the write stream command. Then, whether the remaining time is enough for the automated alternate process is judged in operation S110. If the time left is more than required for the automated alternate process, whether any LBA addresses are registered in the alternate candidate table is judged in operation S111. If the LBA address is registered, whether a flag corresponding to the LBA address is "1", i.e., data attempted to be written or have been written on a sector at the LBA address are stored in a dedicated work area, is judged. If the flag is "1", the data are read from the dedicated work area for executing the automated alternate process. Then the information relating to the LBA address with which the automated alternate process is executed is deleted from the alternate candidate table and the dedicated work area in operation S114. Then the process goes back to operation S110. When there is enough time for the automated alternate process, whether there is other LBA address registered in the alternate candidate table is judged and the automated alternate process is executed as well as the case described above.

When the remaining time is judged as scant or there are no data to be written in the automated alternate process in operation S110, the sequence on the write stream command is terminated.

Figure 6:
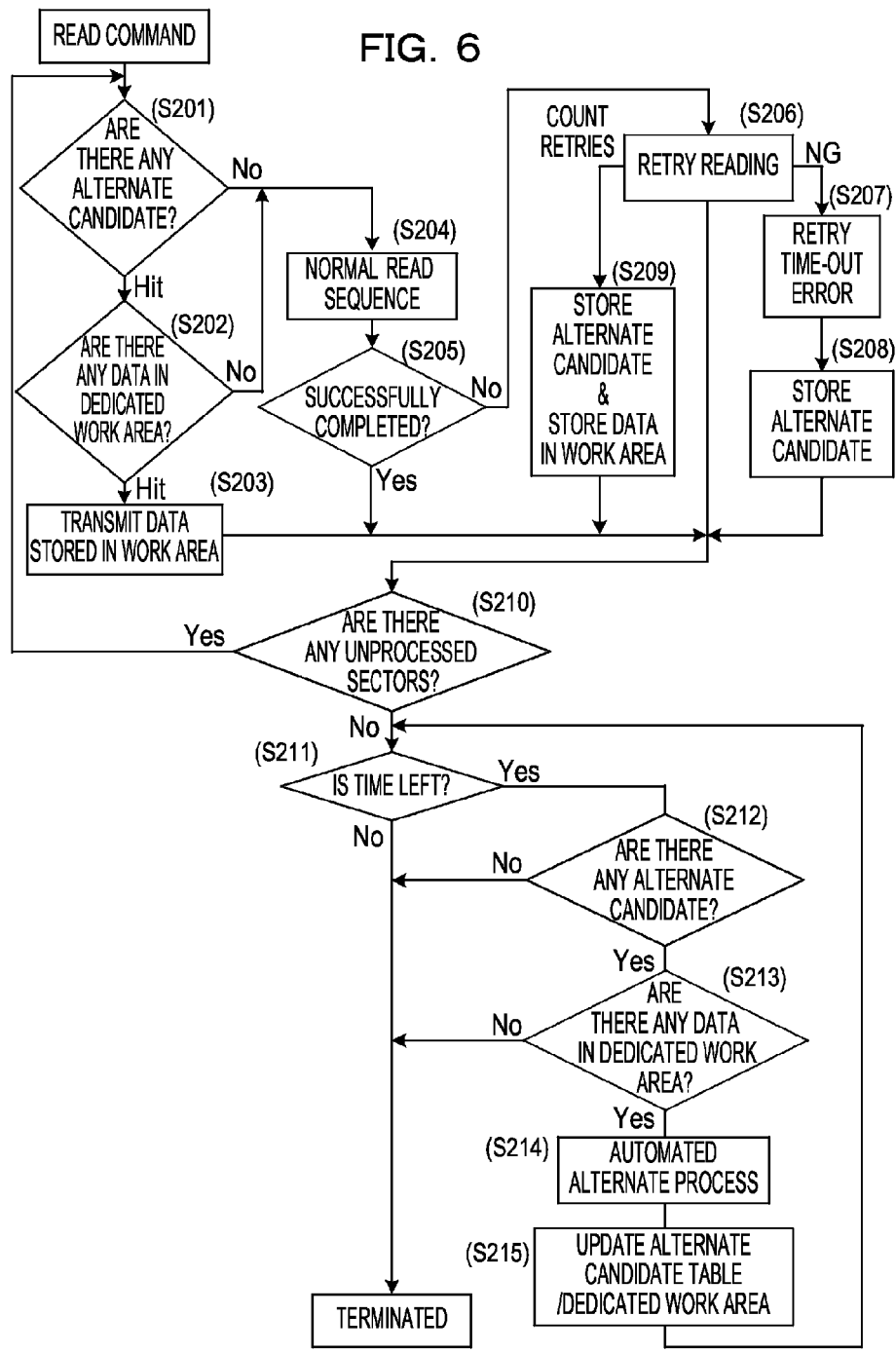
FIG. 6 is a flow chart illustrating a process executed by the MPU on receiving a read stream command.

FIG. 6 is the flow chart illustrating the process executed by the MPU 20 on receiving the read stream command.

A read command commands data be read from the magnetic disks 11 and requires completing the reading in a predefined period of time.

On receiving the read stream command, the MPU 20 checks whether LBA addresses of sectors from which data are read are registered in the alternate candidate table is confirmed is operation S201. When any the LBA addresses of the sectors are registered in the alternate candidate table, whether data corresponding to one of the LBA addresses of the sectors are stored in the dedicated work area, i.e., whether a flag corresponding to the LBA address is "1" is judged in operation S202. If the flag is "1", i.e., data corresponding to the LBA address are stored in the dedicated work area, the data are read from the dedicated work area. The data read from the dedicated work area are used for output to the external apparatus.

Of the sectors from which data are read on the read stream command, whether there are any sectors from which the data are not read yet is judged in operation S210. If there are the sectors from which the data are not read yet, the process goes back to operation S201 and the data are read from sectors.

If any LBA addresses of the sectors from which the data are read on the read stream command are not registered in the alternate candidate table in operation S201, then a read sequence to one of the sectors from which the data are read is executed in operation S204. When the read sequence is completed successfully in operation S205, whether there are any other sectors from which the data are read is judged. If other sectors from which the data are read remain, the process goes back to operation S201 and the same sequence is repeated to one of the remaining sectors.

If the reading is ended abnormally in operation S205, the reading is retried the predefined number of times in operation S206. Nevertheless, if the data are not read and a retry time-out error is caused in operation S207, an LBA address of the sector causing the retry time-out error is registered in alternate candidate table. In this case, data read from the sector do not exist. Thus, a flag corresponding to the LBA address is rewritten to "0".

When the data are successfully read from the sector by retrying the reading more than the threshold and less than the predefined number of times, the process moves on to operation S209.

Although the reading has succeeded, the sector will not be used thereafter because the data are not read from the sector by retrying the reading more than the threshold. The LBA address of the sector is registered in the alternate candidate table and a flag corresponding to the LBA address is rewritten to "1" and the data read from the sector are stored in the dedicated work area.

When the reading is retried and the data are successfully read from the sector by retrying the reading less than the threshold, the sector will be used thereafter. The LBA address of the sector and data thereof are not stored in the alternate candidate table and the dedicated work area respectively.

Whether any sectors of the sectors from which the data are read on the read stream command excluding the sectors whose data are read from the dedicated work area and the sectors whose data are read from the magnetic disks is judged in operation S210. When remaining sectors exist, the process goes back to operation S201 and one of the remaining sectors is processed from operation S201 and the same sequence is repeated to one of the remaining sectors.

In operation S210, if the fact that there is no remaining sector is confirmed, the automated alternate process is executed. First, a remaining time is derived by subtracting time spent on the processes described above from the predefined time for the write stream command. Then, whether there is enough time remaining for executing the automated alternate process is judged. If the time left is more than that required for the automated alternate process, whether any LBA addresses are registered in the alternate candidate table is judged in operation S212. When the LBA address is registered in the alternate candidate table, whether a flag corresponding to the LBA address is "1", i.e., data attempted to be written or have been written on a sector at the LBA address are stored in a dedicated work area, is judged in operation S213. When the flag is "1", the data are read from the dedicated work area for executing the automated alternate process in operation S214. The information relating to the LBA address with which the automated alternate process is executed is deleted from the alternate candidate table and the dedicated work area in operation S215. Then the process moves on to operation S211. When the time is still left, whether there is other LBA address registered in the alternate candidate table is judged and the automated alternate process is executed as described above.

If the remaining time is scant or there is no data to be read in the automated alternate process, the read sequence on the read stream command is terminated.

Figure 7:
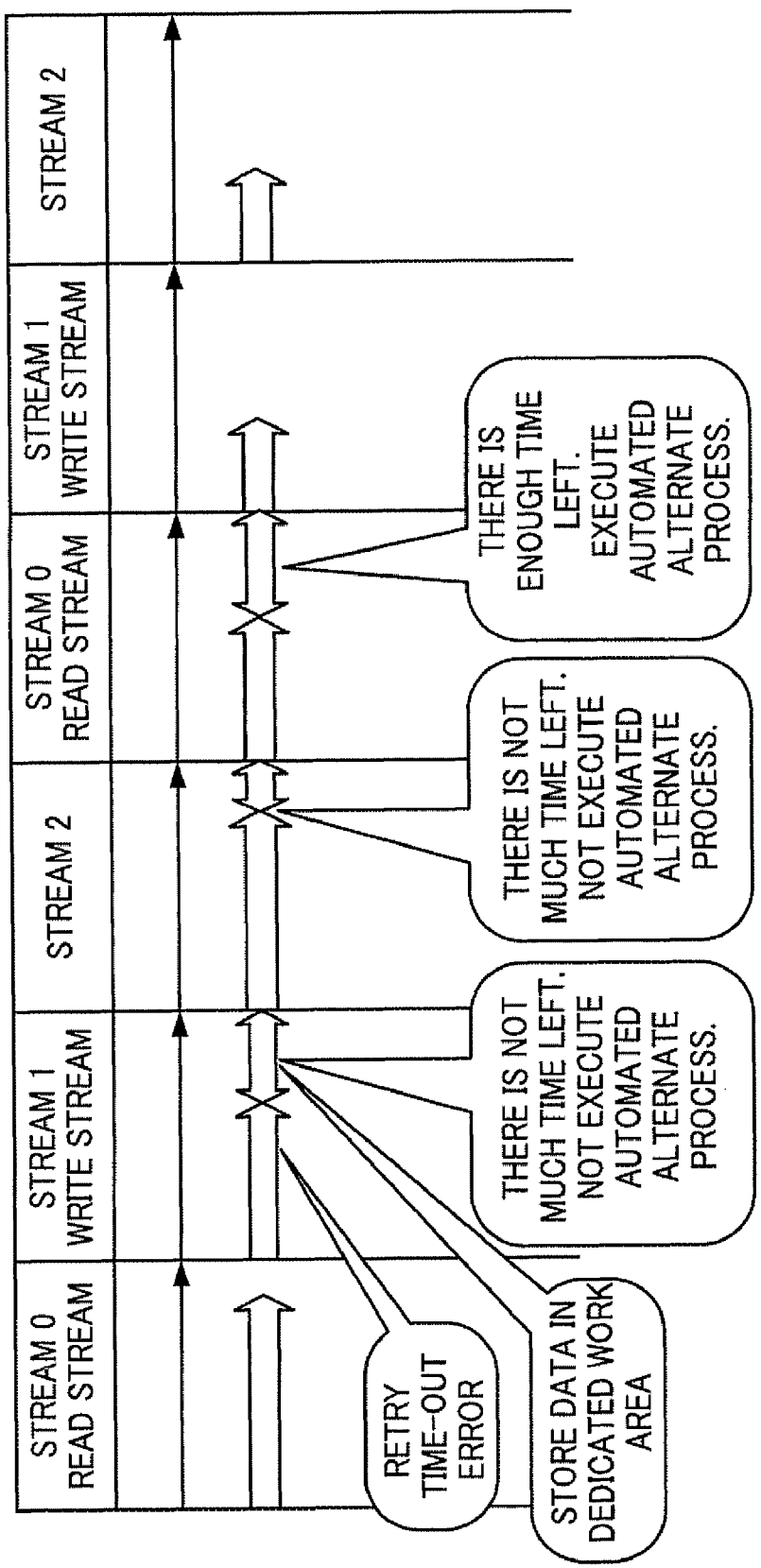
FIG. 7 is a flow process chart illustrating a process executed when an alternate condition is satisfied in stream sequence.

FIG. 7 is a flow chart illustrating the process when the alternate condition is satisfied in executing a stream sequence.

Stream 0, a read stream, on the far left of the FIG. 7 shows that a read sequence is executed successfully. Stream 1 next to stream 0, a write stream, shows that the alternate condition is satisfied in executing a write stream and data are stored in the dedicated work area. In the stream 1, the automated alternate process is not executed because the remaining time is scant.

Stream 2 next to stream 1 shows that the automated alternate process is not executed because the remaining time is scant.

Stream 0 next to stream 2, a read stream, shows that the automated alternate process is executed after a normal read stream is executed and there is much time for the automated alternate process is left. Stream 1 next to stream 2, a write stream, shows that the automated alternate process is not executed because there is no data to be written in the automated alternate process.

Similarly, stream 2 next to stream 0 shows that the automated alternate process is not executed because there is no data to be processed in the automated alternate process.

In this embodiment, the remaining time is judged in executing both read stream commands and write stream commands. If there is much time is left, the automated alternate process is executed regardless of whether the stream or the write stream.

In this embodiment, the alternate candidate table and the dedicated work area are provided in the data buffer 24 shown in FIG. 3. In executing a write stream command or a read stream command, the processes described above are executed with reference to the alternate candidate table and the dedicated work area. If there are data not processed in the automated alternate process, the external device judges that the automated alternate process is terminated. Therefore, writing or reading data is executed as well as when the automated alternate process has been executed.

Additionally, if an access to a sector has succeeded by retrying the access more than the threshold, the sector is registered as an automated alternate candidate even though a retry time-out error is not caused. Therefore, the number of retries is reduced and a margin of the time-out errors becomes larger.

Although a few preferred embodiments of the present application have been shown and described, it would be appreciated by those skilled in the art that changes may be made in these embodiments without departing from the principles and spirit of the application, the scope of which is defined in the claims and their equivalents.

What is claimed is:

1. An access control apparatus controlling an access to a recording area of a recording medium on a command with a command completion time limit requiring completing the command in a predefined period of time, the access control apparatus comprising:
a writable and readable memory;
a command executor executing an access process on the command with the command completion time limit, storing an address of an inaccessible recording area in the memory when an access error is caused, obtaining data attempted to be written on the inaccessible recording area, storing the data associating to the address of the inaccessible recording area in the memory;
an automated alternate processor executing an automated alternate process of the inaccessible recording area in a predefined period of time after the process executed by the command executor is completed; and
a memory updater deleting the address of the inaccessible recording area whose automated alternate process has succeeded and the data attempted to be written in the recording area at the address from the memory.

2. The access control apparatus according to claim 1, wherein the command executor searches in the memory on a write command with time limit and where an address of the recording area to be accessed on the write command is stored in the memory, the data attempted to be written in the recording area at the address are stored in the memory.

3. The access control apparatus according to claim 1, wherein the command executor searches in the memory on the write command with time limit, and when the address of the recording area to be accessed on the write command is not stored in the memory, the recording medium is accessed.

4. The access control apparatus according to claim 1, wherein the command executor searches in the memory on a read command with time limit, and when an address of a recording area to be accessed on the read command and data attempted to be written in a recording area at the address are stored in the memory, the data are read from the memory.

5. The access control apparatus according to claim 1, wherein the command executor searches in the memory on the read command with time limit, and when the address of the recording area to be accessed on the read command is not stored in the memory or the data attempted to be written in the recording area at the address are not stored in the memory, the recording medium is accessed.

6. The access control apparatus according to claim 1, wherein the command executor repeatedly accesses to the recording medium at the maximum number of times predefined when the access on the write command with time limit is failed, and when the access has succeeded when retrying the access more than a threshold and less than the predefined times, the address of the recording area and the data attempted to be written in the recording area at the address are stored in the memory, and when the access has succeeded when retrying the access less than the threshold, the address and the data are not stored in the memory.

7. An access control method controlling an access to a recording area on a recording medium on a command with a time limit requiring completing the command in a predefined period of time, the access control method comprising:

executing an access process on the command with the time limit, associating an address of an inaccessible recording area with data attempted to be written in the inaccessible recording area at the address;

storing the address and the data in a memory when an access error is caused;

executing an automated alternate process of the inaccessible recording area in the predefined period of time; and deleting the address of the recording area whose automated alternate process has succeeded and the data attempted to be written in the recording area at the address from the memory in response to the success of the automated alternate process.

8. The access control method according to claim 7, further comprising:

searching the memory on a write command with a time limit, and storing the data to be stored in the recording area at the address in the memory when the address of the recording area to be accessed on the write command is stored in the memory.

9. The access control method according to claim 7, further comprising:

searching the memory on the write command with the time limit, and accessing the recording medium when the address of the recording area to be accessed on the write command is not stored in the memory.

10. The access control method according to claim 7, further comprising:

searching the memory on a read command with a time limit, storing the address of the recording area to be accessed on the read command and data attempted to be written in the recording area at the address in the memory, and reading the data from the memory.

11. The access control method according to claim 7, further comprising:

searching the memory on the read command with the time limit, and accessing the recording medium when the address of the recording area to be accessed on the read command is not stored in the memory or the data attempted to be written in the recording area at the address are not stored in the memory.

12. The access control method according to claim 7, further comprising:

accessing the recording medium repeatedly at the maximum number of predefined times when the access to the recording medium on the write command with time limit is failed in the command execution operation;

storing the data attempted to be written in the recording area at the address in the memory when the access has succeeded when retrying the access less than the predefined times; and not storing the address and the data in the memory when the access has succeeded when retrying the access less than the threshold.

\* \* \* \* \*